(12) United States Patent
Grigat et al.

(10) Patent No.: US 9,909,014 B2
(45) Date of Patent: Mar. 6, 2018

(54) STAIN REPELLENT COMPOSITIONS AND APPLICATIONS THEREOF

(71) Applicant: Peach State Labs, LLC, Rome, GA (US)

(72) Inventors: Michael Grigat, Rome, GA (US); Ralph R. Sargent, Rome, GA (US); Michael S. Williams, Rome, GA (US)

(73) Assignee: Peach State Labs, LLC, Rome, GA (US)

( * ) Notice: Subject to any disclaimer, the term of this patent is extended or adjusted under 35 U.S.C. 154(b) by 0 days.

(21) Appl. No.: 15/434,866

(22) Filed: Feb. 16, 2017

(65) Prior Publication Data

US 2017/0158874 A1 Jun. 8, 2017

Related U.S. Application Data

(62) Division of application No. 12/719,376, filed on Mar. 8, 2010, now Pat. No. 9,598,526.

(60) Provisional application No. 61/158,282, filed on Mar. 6, 2009, provisional application No. 61/223,109, filed on Jul. 6, 2009.

(51) Int. Cl.

| *C09D 175/00* | (2006.01) |
|---|---|
| *C09D 5/16* | (2006.01) |
| *C09D 175/04* | (2006.01) |
| *C08L 75/04* | (2006.01) |
| *D06M 15/576* | (2006.01) |
| *C09D 175/08* | (2006.01) |
| *C08G 18/50* | (2006.01) |
| *C08G 18/62* | (2006.01) |
| *C08G 18/80* | (2006.01) |
| *C08G 18/28* | (2006.01) |

(52) U.S. Cl.
CPC ............ *C09D 5/1637* (2013.01); *C08L 75/04* (2013.01); *C09D 175/04* (2013.01); *C09D 175/08* (2013.01); *D06M 15/576* (2013.01); *C08G 18/2835* (2013.01); *C08G 18/2885* (2013.01); *C08G 18/5015* (2013.01); *C08G 18/6225* (2013.01); *C08G 18/8087* (2013.01); *C08L 2201/54* (2013.01); *D06M 2200/01* (2013.01); *D06M 2200/11* (2013.01); *D06M 2200/12* (2013.01)

(58) Field of Classification Search
CPC ............... C09D 175/04; C09D 175/08; C08G 18/2885; C08G 18/2835; C08G 18/5015; C08G 18/6225; C08G 18/8087
See application file for complete search history.

(56) References Cited

U.S. PATENT DOCUMENTS

| 4,792,354 A | 12/1988 | Matsuo et al. |
|---|---|---|
| 5,350,795 A | 9/1994 | Smith et al. |
| 5,453,540 A | 9/1995 | Dams et al. |
| 5,509,939 A | 4/1996 | Kirchner |
| 6,376,592 B1 | 4/2002 | Shimada et al. |
| 6,383,633 B1 | 5/2002 | Allewaert et al. |
| 2003/0105263 A1 | 6/2003 | Fan et al. |

OTHER PUBLICATIONS

Advisory Action, U.S. Appl. No. 12/719,376, dated Jun. 8, 2015, 3 pages.
Final Office Action, U.S. Appl. No. 12/719,376, dated Oct. 30, 2012, 19 pages.
Final Office Action, U.S. Appl. No. 12/719,376, dated Feb. 3, 2015, 8 pages.
Final Office Action, U.S. Appl. No. 12/719,376, dated Mar. 30, 2016, 8 pages.
Non Final Office Action Received, U.S. Appl. No. 12/719,376, dated Mar. 22, 2012, 11 pages.
Non-Final Office Action, U.S. Appl. No. 12/719,376, dated Jun. 10, 2014, 15 pages.
Non-Final Office Action, U.S. Appl. No. 12/719,376, dated Sep. 4, 2015, 8 pages.
Notice of Allowance, U.S. Appl. No. 12/719,376, dated Nov. 9, 2016, 8 pages.

*Primary Examiner* — Michael L Leonard
(74) *Attorney, Agent, or Firm* — Kilpatrick Townsend & Stockton LLP

(57) ABSTRACT

The present invention provides fluorinated compounds as well as dispersions of the fluorinated compounds. The fluorinated compounds described herein, in some embodiments, can be applied substrates such as textiles, including carpet and other floor coverings.

20 Claims, No Drawings

STAIN REPELLENT COMPOSITIONS AND APPLICATIONS THEREOF

CROSS-REFERENCE TO RELATED APPLICATIONS

This application claims priority to U.S. patent application Ser. No. 12/719,376, filed Mar. 8, 2010, which claims priority pursuant to 35 U.S.C. § 119(e) to U.S. Provisional Patent Application Ser. No. 61/158,282, filed Mar. 6, 2009 and U.S. Provisional Patent Application Ser. No. 61/223,109, filed Jul. 6, 2009, all of which are hereby incorporated by reference in their entirety.

FIELD OF THE INVENTION

The present invention relates to fluorinated compounds operable to impart oil, water and/or soil repellency to substrates such as textiles including fabrics, carpets and other floor coverings.

BACKGROUND OF THE INVENTION

Manufactures of textiles are continuously searching for compositions to enhance textile fiber performance and durability. In the carpet and floor coverings industry, for example, manufacturers desire compositions operable to render carpet fibers stain resistant. Fluorinated compounds have been used extensively to impart water and oil repellency to textile and carpet fibers. Fluorocarbon compounds, for example, can provide both oil and water repellency, unlike waxes, silicones, etc., which typically provide water repellency, but are somewhat oleophilic, and thus do not provide good oil repellency.

Fluorinated compounds, when applied to fibers in sufficient amount, can lower the surface energy of the fiber or fabric below the surface energy of water or oils that might be spilled onto the fabric, thereby allowing removal of these liquids before penetration into the fiber or fabric. This is of great benefit for fibers and fabrics used in clothing, residential, commercial, and industrial settings as the useful life of the fibers and fabric is substantially increased.

The manufacture of fluorinated compounds, nevertheless, generally employs the use of organic solvents presenting several disadvantages. Substrates, including textile fibers, treated with organic solutions or dispersions of fluorinated compounds, for example, often require an extraction step to remove the organic solvent. An extraction step increases the time and cost of producing a stain repellent substrate.

Organic solvent extraction from a substrate can be avoided by using aqueous dispersions of fluorinated compounds. However, production of aqueous dispersions of fluorinated compounds necessitate stripping of the organic solvent used in the production of the fluorinated compounds. Organic solvent stripping from an aqueous dispersion by distillation and other techniques can additionally increase the time and cost of producing a stain repellent substrate. Furthermore, providing stable aqueous dispersions of fluorinated compounds can be difficult requiring the use of dispersing aids such as surfactants and organic cosolvents.

SUMMARY

In view of the foregoing, the present invention provides fluorinated compounds as well as solutions and dispersions of the fluorinated compounds. In some embodiments, fluorinated compounds of the present invention are produced in the absence of an organic solvent or cosolvent. Moreover, in some embodiments, aqueous dispersions of fluorinated compounds of the present invention do not comprise dispersing aids such as surfactants and/or organic cosolvents. In some embodiments, fluorinated compounds described herein and solutions or dispersions thereof can be applied substrates such as textiles, including carpet and other floor coverings.

In one aspect, the present invention provides a fluorinated compound comprising a reaction product of a polyisocyanate component and a diol component or a diamine component or a mixture thereof, the reaction product further reacted with an organic component comprising molecules of at least one compound having a plurality of fluorinated carbon atoms and at least one isocyanate reactive functionality. In some embodiments, the organic component further comprises molecules of at least one non-fluorinated compound having at least one isocyanate reactive functionality.

In some embodiments, a fluorinated compound comprising a reaction product of a polyisocyanate component and a diol component or a diamine component or a mixture thereof, the reaction product further reacted with an organic component is a compound of Formula (I):

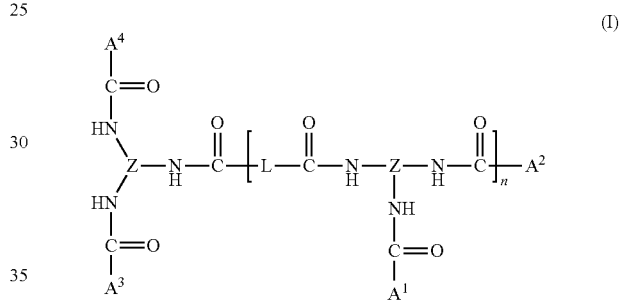

wherein Z is a trivalent organic group;
L is a divalent diol, diamine, urea, dialcohol amine or an aminoalcohol or a mixture thereof;
n ranges from 1 to 30;
and $A^1$, $A^2$, $A^3$ and $A^4$ are independently selected from the group consisting of $R^f$—$R^a$—X— and $R^o$—X—, wherein at least one of $A^1$, $A^2$, $A^3$ and $A^4$ is $R^f$—$R^a$—X—;
wherein $R^f$ is a fluoroalkyl;
$R^a$ is a direct bond, alkyl, —$C_mH_{2m}$SO—, —$C_mH_{2m}SO_2$—, —$SO_2N(R^1)$—, —$CON(R^1)$—, wherein m ranges from 1 to 20 and $R^1$ is hydrogen or alkyl; and
X is —O—, —S— or —$N(R^2)$—, wherein $R^2$ is hydrogen or alkyl; and
$R^o$ is -alkyl, -alkenyl, -cycloalkyl, -chloroalkyl, -chloroalkenyl, -chlorocycloalkyl, —O-alkyl-glycidyl, —$R^3$—O—$R^4$,

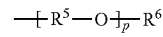

or —O—$R^{24}$—O—C(O)—$R^{25}$,
wherein $R^3$, $R^4$, $R^5$, $R^6$, $R^{24}$ and $R^{25}$ are independently selected from the group consisting of alkyl and alkenyl and p ranges from 1 to 50 and wherein the alkyl and alkenyl of $R^3$-$R^6$, $R^{24}$ and $R^{25}$ are optionally independently substituted one or more times with a substituent selected from the group consisting of alkyl, alkenyl, and halo.

In some embodiments, $A^1$ is independently selected for each repeating unit in Formula (I). In some embodiments of a compound of Formula (I), for example, $A^1$ is $R^f$—$R^a$—X— in one repeating unit and $R^o$—X— in another repeating unit. Moreover, in some embodiments, $A^1$ is the same in all or substantially all of the repeating units of a compound of Formula (I).

In some embodiments, Z is selected from the following trivalent organic compounds:

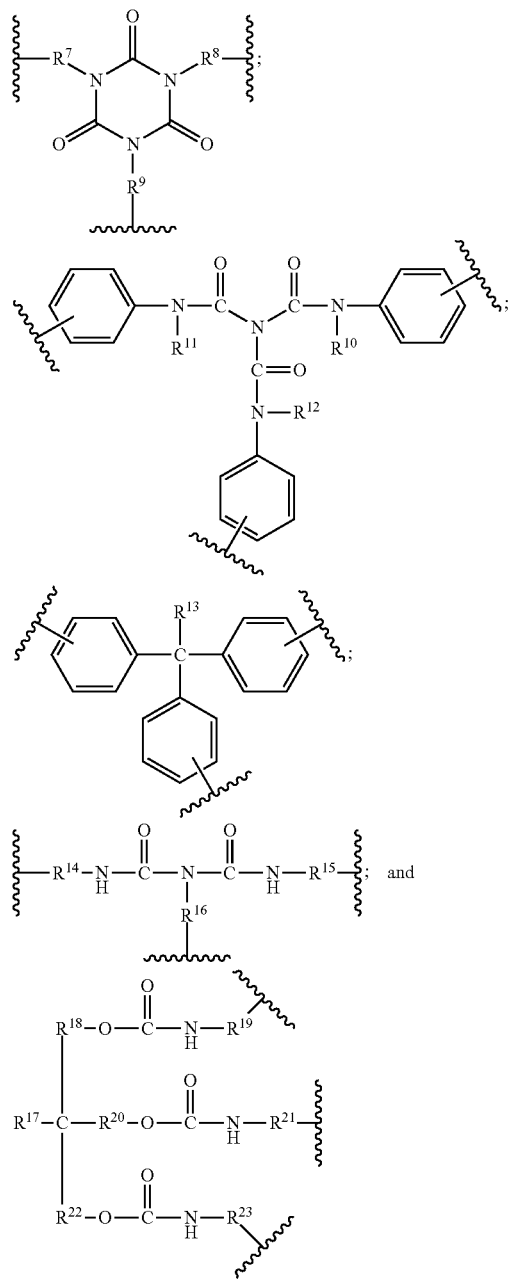

wherein $R^7$, $R^8$, $R^9$, $R^{13}$, $R^{14}$, $R^{15}$, $R^{16}$, $R^{17}$, $R^{18}$, $R^{19}$, $R^{20}$, $R^{21}$, $R^{22}$ and $R^{23}$ are independently selected from the group consisting of alkyl, alkenyl, cycloalkyl, and aryl; and wherein $R^{10}$, $R^{11}$ and $R^{12}$ are independently selected from the group consisting of hydrogen and alkyl;

wherein the alkyl, alkenyl, cycloalkyl and aryl of groups of $R^7$-$R^{23}$ are optionally independently substituted one or more times with a substituent selected from the group consisting of -alkyl, -alkenyl, -fluoroalkyl, -chloroalkyl, bromoalkyl, -aryl, —O-alkyl, —O-alkenyl, —O-aryl, —O-alkylene-aryl, -carboxyl, -hydroxyl, -halo and -nitro; and wherein 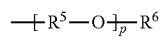 is a point of attachment of the trivalent organic compound in Formula (I).

Moreover, in some embodiments, L can comprise any divalent diol, diamine, urea, dialcohol amine or aminoalcohol not inconsistent with the principles and objectives of the present invention. In some embodiments L is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cylcohexanediol, ethanolamine, diethanolamine, methyldiethanolamine or phenyldiethanolamine, aminopropanol or mixtures thereof.

In some embodiments, fluoroalkyl, $R^f$, is selected from the group consisting of $C_qF_{2q+1}$ and $(CF_3)_2CFO(CF_2CF_2)_t$ wherein q ranges from 4 to 20 and t ranges from 1 to 5. In one non-limiting embodiment, for example, q is 6.

Additionally, in some embodiments $R^o$ is a monoalkyl ether of a polyalkylene glycol having the formula $$\underset{}{-\!\!\!\!+\!\!R^5\!-\!\!O\!\!-\!\!]\!\!_p\!R^6}$$

as defined above. In some embodiments, $R^o$ comprises a monoalkyl ether of a polyethylene glycol, polypropylene glycol or copolymers thereof. In some embodiments, $R^o$ comprises a chloroalkyl group.

Fluorinated compounds of the reaction products described herein, including fluorinated compounds of Formula (I), can have any desired molecular weight. The molecular weight of a fluorinated compound can be selected according to several parameters including the ability to provide an aqueous dispersion of the fluorinated compound without dispersing agents and/or the ability to exhaust the fluorinated compound onto a substrate.

In some embodiments, a fluorinated compound, including a compound of Formula (I), comprising a reaction product of a polyisocyanate component and a diol component or a diamine component or a mixture thereof, the reaction product further reacted with an organic component has a molecular weight of at least about 2,000. In some embodiments, a fluorinated compound has a molecular weight of at least about 4,000. In some embodiments, a fluorinated compound has a molecular weight greater than about 8,000. In one embodiment, for example, a fluorinated compound has a molecular weight ranging from about 8,250 to about 20,000. In another embodiment, a fluorinated compound has a molecular weight ranging from about 9,000 to about 15,000. In some embodiments, a fluorinated compound has a molecular weight less than about 2,000 or greater than about 20,000.

In another aspect, the present invention provides aqueous dispersions of a fluorinated compound comprising the reaction product of a polyisocyanate component and a diol component or a diamine component or a mixture thereof, the reaction product further reacted with an organic component as described herein. In one embodiment, for example, the present invention provides aqueous dispersions of a compound of Formula (I). In some embodiments, aqueous dispersions of a fluorinated compound are free or substantially free of dispersing aids including, but not limited to, surfactants and/or organic cosolvents.

The present invention, in another aspect, provides a substrate at least partially treated or coated with a fluorinated compound comprising the reaction product of a polyisocyanate component and a diol component or a diamine component or a mixture thereof, the reaction product further reacted with an organic component as described herein. In some embodiments, a substrate is at least partially treated or coated with a fluorinated compound of Formula (I). In some embodiments, a fluorinated compound is applied to substrate as an aqueous dispersion. In some embodiments, wherein an aqueous dispersion of a fluorinated compound described herein does not comprise dispersing aids, a substrate treated with such a dispersion is not subjected to subsequent washing or extraction steps to remove residual dispersing aids.

Substrates, in some embodiments, comprise cellulosic materials, including paper, wood, cellulose acetate fibers, and cotton materials, including, but not limited to, cotton fibers, woven cotton articles, and non-woven cotton articles. In other embodiments, a substrate comprises other natural fibers including, but not limited to, wool and silk fibers.

In another embodiment, a substrate comprises synthetic fibers. Synthetic fibers, in some embodiments, comprise nylon (polyamide) fibers, polyester fibers such as PTT, polyethylene terephthalate (PET), polybutylene terephthalate (PBT), polyolefin fibers such as polypropylene, polyurethane fibers, polyacrylonitrile fibers, or combinations or composites thereof. In some embodiments, for example, a substrate comprises a mixture or combination of synthetic fibers including PTT fibers combined with any one of polyester fibers such as PET and/or PBT fibers, polyamide fibers, polyolefin fibers such as polypropylene fibers, polyurethane fibers, and/or any combination thereof. In some embodiments, for example, a substrate comprises a combination of synthetic fibers including PTT fibers with natural fibers. Substrates comprising various combinations of fibers, in some embodiments of the present invention, are considered composite substrates.

In a further embodiment, a substrate comprises leather, thermoplastics, thermosets, metals, porcelain, carpet, masonry, stones, brick, wood, plastics, painted surfaces, and dyed surfaces.

In coating or treating a substrate with an aqueous dispersion, a fluorinated compound of the present invention, in some embodiments, is associated with one or more surfaces of the substrate. In some embodiments, for example, a fluorinated compound is associated with a surface of the substrate through electrostatic interactions, covalent bonds, dipole-dipole interactions, van der Waals interactions or hydrophobic interactions or combinations thereof. In other embodiments, a fluorinated compound is associated with a surface of a substrate by mechanical engagement. In one embodiment, for example, a fluorinated compound described herein is trapped between a plurality of filaments in a fiber such as a synthetic fiber. In some embodiments, a fluorinated compound is trapped between polymeric chains of one or more fiber filaments.

Fluorinated compounds of the present invention, in some embodiments, can be applied with other stain resistant species. In some embodiments, a substrate treated or coated with a fluorinated compound can demonstrate increased or enhanced repellency of oil and water. Moreover, in some embodiments, a substrate treated or coated with a fluorinated compound can demonstrate advantageous soil resistance and/or release properties.

In another aspect, the present invention provides methods of producing fluorinated compounds. In one embodiment, a method of producing a fluorinated compound comprises reacting a polyisocyanate component with a diol component or a diamine component or a mixture thereof to provide a reaction product and reacting the reaction product with an organic component comprising molecules of at least one compound having a plurality of fluorinated carbon atoms and at least one isocyanate reactive functionality. In some embodiments, the organic component further comprises molecules of at least one non-fluorinated compound having at least one isocyanate reactive functionality.

In some embodiments, a method of producing a fluorinated compound of Formula (I), for example, comprises reacting an amount of a bifunctional isocyanate compound of formula:

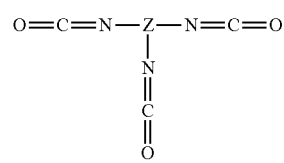

with an amount of a diol or diamine component of formula:

H-L-H to produce a reaction product of a compound of Formula (IA):

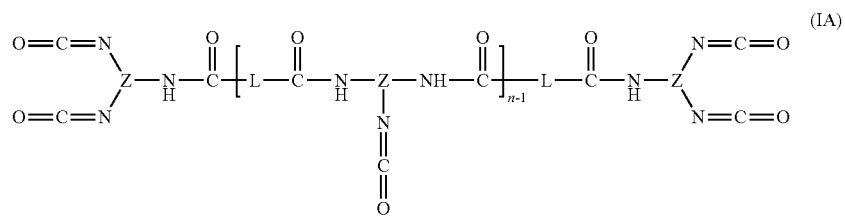

wherein Z and L are defined above.

In some embodiments, a diol of formula H-L-H is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cylcohexanediol or mixtures thereof. In some embodiments, a diol of formula H-L-H comprises one or more diols having a polymeric structure including, but not limited to, polyalkylene glycols such as polyethylene glycols, polypropylene glycols or mixtures thereof. In some embodiments, diols having a polymeric structure comprise polyester-based diols, polycarbonate-based diols or mixtures thereof. A diol having a polymeric structure can have any desired molecular weight not inconsistent with the objectives of the present invention.

In some embodiments, a dialcohol amine of formula H-L-H is diethanolamine, methyldiethanolamine or phenyldiethanolamine or mixtures thereof. In some embodiments, an aminoalcohol of formula H-L-H is aminopropanol or ethanolamine or a mixture thereof.

In some embodiments, a diamine of formula H-L-H comprises ethylene diamine, propylene diamine, butylene diamine or hexamethylene diamine or mixtures thereof. A diamine also encompasses diamine derivatives including, but not limited to, diamides such as urea.

In some embodiments, a reaction product of Formula (IA) can be oligomeric or polymeric.

Unreacted isocyanate groups of the reaction product of Formula (IA) are independently reacted with an organic component comprising molecules of compounds selected from the group consisting of Foimula (II) and Formula (III):

$$R^f\text{—}R^a\text{—}X\text{—}H \quad (II)$$

$$R^o\text{—}X\text{—}H \quad (III)$$

such that all or substantially all of the unreacted isocyanate groups of the reaction product of Formula (IA) have been reacted resulting in a compound of Formula (I), wherein $R^f$, $R^a$, $R^o$ and X are defined above. As provided herein, in some embodiments, the unreacted isocyanate group of each repeating unit of a reaction product of Formula (IA) can react with a compound of Formula (II) or a compound of Formula (III). As a result, in some embodiments, an unreacted isocyanate of one repeating unit can react with a compound of Formula (II) while an unreacted isocyanate group on an adjacent repeating unit can react with a compound of Formula (III). In other embodiments, unreacted isocyanate groups of adjacent repeating units each react with a compound of Formula (II) or each react with a compound of Formula (III).

In some embodiments, a compound of Formula (II) comprises a fluorinated alcohol of the formula $(C_qF_{2q+1})(CH_2)_uOH$, wherein q ranges from 4 to 20 and u ranges from 1 to 20. In one embodiment, for example, a compound of Formula (II) provided for reaction with unreacted isocyanate groups of a reaction product of Formula (IA) is a single species of fluorinated alcohol. In some embodiments, a single species of fluorinated alcohol is selected from the group consisting of $(C_4F_9)(CH_2)_uOH$, $(C_6F_{13})(CH_2)_uOH$, $(C_8F_{17})(CH_2)_uOH$, $(C_{10}F_{21})(CH_2)_uOH$, $(C_{12}F_{25})(CH_2)_uOH$, $(C_{14}F_{28})(CH_2)_uOH$, $(C_{16}F_{33})(CH_2)_uOH$, $(C_{18}F_{39})(CH_2)_uOH$ and $(C_{20}F_{41})(CH_2)_uOH$ wherein u is defined above.

In other embodiments, a compound of Formula (II) for reaction with unreacted isocyanate groups of a reaction product of Formula (IA) is provided as a mixture fluoroalcohols. In some embodiments, a mixture can comprise any two or more of the following fluoroalcohols: $(C_4F_9)(CH_2)_uOH$, $(C_6F_{13})(CH_2)_uOH$, $(C_8F_{17})(CH_2)_uOH$, $(C_{10}F_{21})(CH_2)_uOH$, $(C_{12}F_{25})(CH_2)_uOH$, $(C_{14}F_{28})(CH_2)_uOH$, $(C_{16}F_{33})(CH_2)_uOH$, $(C_{18}F_{39})(CH_2)_uOH$ and $(C_{20}F_{41})(CH_2)_uOH$, wherein u is defined above.

Moreover, in some embodiments, a compound of Formula (III) comprises a monoalkyl ether of a polyalkylene glycol having the formula

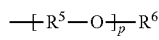

as defined above. In some embodiments, a compound of Formula (III) provided for reaction with unreacted isocyanate groups of a reaction product of Formula (IA) is a single species of a monoalkyl ether of a polyalkylene glycol. In other embodiments, a compound of Formula (III) provided for reaction with unreacted isocyanate groups of a reaction product of Formula (IA) is provided as a mixture of various monoalkyl ethers of polyalkylene glycols.

In some embodiments, a compound of Formula (III) comprises a chlorinated alcohol. Non-limiting examples of chlorinated alcohols comprise 1,3-dichloro-2-propanol, 2,2, 2-trichloroethanol and 2,2-dichloroethanol. Moreover, a compound of Formula (III), in some embodiments, comprises epoxy or glycidyl alcohols. A non-limiting example of an epoxy alcohol is 2,3-epoxy-1-propanol. In some embodiments, a compound of Formula (III) comprises hydroxy functional acrylates and methacrylates including, but not limited to, 2-hydroxyethylmethacrylate, 2-hydroxyethylacrylate, 2-hydroxypropylmethacrylate and 2-hydroxypropylacrylate.

In some embodiments, a compound of Formula (III) provided for reaction with unreacted isocyanate groups of a reaction product of Formula (IA) comprises a mixture comprising at least two of polyalkylene glycol, a chlorinated alcohol, a glycidyl alcohol and a hydroxy functional acrylate.

As provided herein, methods of producing fluorinated compounds, in some embodiments, do not employ organic solvents.

In another aspect, the present invention provides a method of producing an aqueous dispersion of a fluorinated compound comprising the reaction product of a polyisocyanate component and a diol component or a diamine component or a mixture thereof, the reaction product further reacted with an organic component comprising molecules of at least one compound having a plurality of fluorinated carbon atoms and at least one isocyanate reactive functionality. In one embodiment, a method of producing a dispersion of a fluorinated compound described herein comprises providing the fluorinated compound and dispersing the fluorinated compound in an aqueous medium without the use of a dispersing aid. Fluorinated compounds can be provided according to the methods of synthesis described herein.

Production of fluorinated compounds described herein in the absence of organic solvents, in some embodiments, can facilitate the production of aqueous dispersions of the fluorinated compounds. The absence of an organic solvent, for example, can preclude the requirement to strip or further process the organic solvent during production of the aqueous dispersion. As a result, in some embodiments, water can be added directly to the reaction mixture comprising a fluorinated compound to produce an aqueous dispersion of the fluorinated compound.

In a further aspect, the present provides methods of enhancing the oil and/or water repellency of substrates, including fibers, textiles, carpets and floor coverings. In one embodiment, a method of enhancing the oil and/or water repellency of a substrate comprises providing an aqueous dispersion of a fluorinated compound described herein and applying the aqueous dispersion to the substrate.

In some embodiments, applying the aqueous dispersion to the substrate comprises spray coating, dip coating, foaming, exhausting, passing the substrate through kiss rollers or spreading onto or coating the substrate through a head box, optionally with the aid of a doctor blade or any other application or exhaustion method or technique known to one of skill in the art.

These and other embodiments are described in greater detail in the detailed description which follows.

DETAILED DESCRIPTION

The term "alkyl" as used herein, alone or in combination, refers to a straight or branched chain saturated hydrocarbon radical having from 1 to 20 carbon atoms. Non-limiting examples of alkyl groups include $C_{1-8}$-alkyl or $C_{1-6}$-alkyl. Typical $C_{1-8}$-alkyl groups and $C_{1-6}$-alkyl groups include, but are not limited to e.g. methyl, ethyl, n-propyl, isopropyl, n-butyl, sec-butyl, isobutyl, tert-butyl, n-pentyl, 2-methylbutyl, 3-methylbutyl, 4-methylpentyl, neopentyl, n-pentyl, n-hexyl, 1,2-dimethylpropyl, 2,2-dimethylpropyl, 1,2,2-trimethylpropyl and the like. The term "$C_{1-8}$-alkyl" as used herein also includes secondary $C_{3-8}$-alkyl and tertiary $C_{4-8}$-alkyl. The term "$C_{1-6}$-alkyl" as used herein also includes secondary $C_{3-6}$-alkyl and tertiary $C_{4-6}$-alkyl.

The term "alkenyl" as used herein, alone or in combination, refers to a straight or branched chain hydrocarbon radical containing from 2 to 20 carbon atoms and at least one carbon-carbon double bond. Non-limiting examples of alkenyl groups include $C_{2-8}$-alkenyl or $C_{2-6}$-alkenyl. Typical $C_{2-8}$-alkenyl groups and $C_{2-6}$-alkenyl groups include, but are not limited to, vinyl, 1-propenyl, 2-propenyl, iso-propenyl, 1,3-butadienyl, 1-butenyl, 2-butenyl, 3-butenyl, 2-methyl-1-propenyl, 1-pentenyl, 2-pentenyl, 3-pentenyl, 4-pentenyl, 3-methyl-2-butenyl, 1-hexenyl, 2-hexenyl, 3-hexenyl, 2,4-hexadienyl, 5-hexenyl and the like.

The term "cycloalkyl" as used herein, alone or in combination, refers to a non-aromatic hydrocarbon radical having from three to twelve carbon atoms, and optionally with one or more degrees of unsaturation, for example $C_{3-8}$-cycloalkyl. Such a ring may be optionally fused to one or more benzene rings or to one or more of other cycloalkyl ring(s). Typical $C_{3-8}$-cycloalkyl groups include, but are not limited to, cyclopropyl, cyclobutyl, cyclopentyl, cyclohexyl, cyclohexenyl, cycloheptyl, cycloheptenyl, cyclooctyl and the like.

The term "aryl" as used herein refers to a carbocyclic aromatic ring radical or to a aromatic ring system radical. Aryl is also intended to include the partially hydrogenated derivatives of the carbocyclic systems.

The term "fluoroalkyl," as used herein, has the same respective meanings as alkyl and alkenyl above provided that at least one carbon atom of the group is substituted with at least one fluorine atom. In some embodiments, more than one carbon atom of the alkyl group is substituted with a plurality fluorine atoms. Fluoroalkyl additionally encompasses perfluorinated alkyl and alkenyl groups.

The term "chloroalkyl," as used herein, has the same respective meanings as alkyl and alkenyl above provided that at least one carbon atom of the group is substituted with at least one chlorine atom. In some embodiments, more than one carbon atom of the alkyl group is substituted with a plurality chlorine atoms. Chloroalkyl additionally encompasses perchlorinated alkyl and alkenyl groups.

The term "isocyanate reactive functionality," as used herein, refers to a chemical functionality capable of chemically reacting with an isocyanate group. Non-limiting examples of a isocyanate reactive functionality include hydroxyl, carboxyl, amine, thiol and several other functional groups containing an active hydrogen moiety.

The present invention provides fluorinated compounds as well as solutions and dispersions of the fluorinated compounds. In some embodiments, fluorinated compounds described herein are produced in the absence of an organic solvent. Moreover, in some embodiments, aqueous dispersions of fluorinated compounds of the present invention do not comprise dispersing aids such as surfactants and/or organic cosolvents. Fluorinated compounds described herein and solutions or dispersions thereof can be applied substrates such as textiles, including carpet and other floor coverings.

In one aspect, the present invention provides a fluorinated compound comprising a reaction product of a polyisocyanate component and a diol component or a diamine component or a mixture thereof, the reaction product further reacted with an organic component comprising molecules of at least one compound having a plurality of fluorinated carbon atoms and at least one isocyanate reactive functionality. In some embodiments, the organic component further comprises molecules of at least one non-fluorinated compound having at least one isocyanate reactive functionality.

A polyisocyanate component used in the production of the reaction product can comprise molecules of one or more species of polyisocyanates. In some embodiments, a polyisocyanate component comprises molecules having at least three isocyanate groups. In some embodiments a polyisocyanate component comprises molecules having at least four or at least five isocyanate groups. In some embodiments, a polyisocyanate component comprises molecules of one or more of the following polyisocyanates:

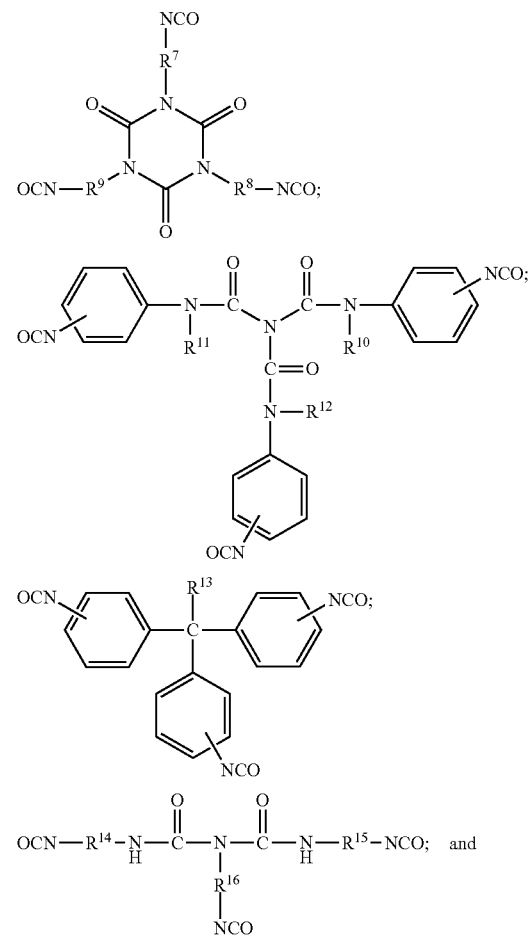

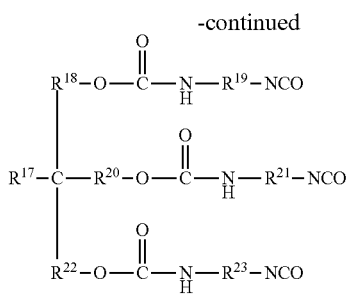

wherein $R^7$, $R^8$, $R^9$, $R^{13}$, $R^{14}$, $R^{15}$, $R^{16}$, $R^{17}$, $R^{18}$, $R^{19}$, $R^{20}$, $R^{21}$, $R^{22}$ and $R^{23}$ are independently selected from the group consisting of alkyl, alkenyl, cycloalkyl, and aryl; and wherein $R^{10}$, $R^{11}$ and $R^{12}$ are independently selected from the group consisting of hydrogen and alkyl; and wherein the alkyl, alkenyl, cycloalkyl and aryl of groups of $R^7$-$R^{23}$ are optionally independently substituted one or more times with a substituent selected from the group consisting of -alkyl, -alkenyl, -fluoroalkyl, -chloroalkyl, -bromoalkyl, -aryl, —O-alkyl, —O-alkenyl, —O-aryl, —O-alkylene-aryl, -carboxyl, -hydroxyl, -halo and -nitro.

In some embodiments, suitable polyisocyanates are commercially available from Bayer Material Science of Pittsburgh, PA under the DESMODUR® trade designation including, but not limited to, DESMODUR® N-3300A, DESMODUR® N-3200, DESMODUR® N-3400, DESMODUR® N-3600 and DESMODUR® XP 2410. In some embodiments, suitable polyisocyanates are commercially available from Bayer Material Science of Pittsburgh, Pa. under the BAYHYDUR® trade designation including, but not limited to, BAYHYDUR® XP 2547. In some embodiments, suitable polyisocyanates are commercially available from Perstorp of Toledo, Ohio under the TOLONATE® trade designation including, but not limited to, TOLONATE® HDT, TOLONATE® HDT-LV, TOLONATE® HDT-LV2, TOLONATE® HDB and TOLONATE® HDB-LV.

A diol component, which in some embodiments is used in conjunction with the polyisocyanate component in the production of a reaction product, can comprise molecules of one or more species of diols. In some embodiments, a diol component comprises molecules of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cylcohexanediol, diethanolamine, methyldiethanolamine or phenyldiethanolamine or mixtures thereof.

In some embodiments, a diol component comprises one or more diols having a polymeric structure including, but not limited to, polyalkylene glycols such as polyethylene glycols, polypropylene glycols or mixtures thereof. In some embodiments, diols having a polymeric structure comprise ethylene oxide/propylene oxide copolymers. In some embodiments, diols having a polymeric structure comprise polyester-based diols, polycarbonate-based diols or mixtures thereof. A diol having a polymeric structure can have any desired molecular weight not inconsistent with the objectives of the present invention. In some embodiments, a diol component comprises polyethylene glycol (PEG) 300, PEG 400, PEG 600 or mixtures thereof. In some embodiments, a diol component comprises polypropylene glycol (PPG) 1000, PPG 2000 or mixtures thereof. In some embodiments, a diol component comprises a PEG and/or PPG that is liquid at room temperature.

A diamine component, which in some embodiments is used in conjunction with the polyisocyanate component in the production of a reaction product, can comprise molecules of one or more species of diamines. Amine functionalities of diamines suitable for use in the diamine component comprise at least one hydrogen operable for reaction with an isocyanate functionality. In some embodiments, a diamine component comprises molecules of ethylene diamine, propylene diamine, butylene diamine or hexamethylene diamine or mixtures thereof. A diamine component also encompasses diamine derivatives including, but not limited to, diamides such as urea. A diamine component also encompasses monoalcohol amines such as ethanolamine, aminopropanol or mixtures thereof. In some embodiments, a fluorinated compound described herein does not comprise a urea linkage.

As described herein, the polyisocyanate component is reacted with the diol component or the diamine component or a mixture thereof to provide a reaction product. The reaction product is subsequently reacted with an organic component comprising molecules of at least one compound having a plurality of fluorinated carbon atoms and at least one isocyanate reactive functionality.

In some embodiments, a compound of an organic component having a plurality of fluorinated carbon atoms and at least one isocyanate reactive functionality is a compound of Formula (II):

$$R^f\text{—}R^a\text{—}X\text{—}H \qquad (II)$$

wherein $R^f$, $R^a$, $R^o$ and X are defined above. In some embodiments, a compound of Formula (II) comprises a fluorinated alcohol of the formula $(C_qF_{2q+1})(CH_2)_uOH$, wherein q ranges from 4 to 20 and u ranges from 1 to 20. In some embodiments, for example, molecules of a compound of Formula (II) react with unreacted isocyanate groups of the reaction product resulting from the combination of the polyisocyanate component with the diol component and/or diamine component. In some embodiments, a single species of fluorinated alcohol is selected from the group consisting of $(C_4F_9)(CH_2)_uOH$, $(C_6F_{13})(CH_2)_uOH$, $(C_8F_{17})(CH_2)_uOH$, $(C_{10}F_{21})(CH_2)_uOH$, $(C_{12}F_{25})(CH_2)_uOH$, $(C_{14}F_{28})(CH_2)_uOH$, $(C_{16}F_{33})(CH_2)_uOH$, $(C_8F_{39})(CH_2)_uOH$ and $(C_{20}F_{41})(CH_2)_uOH$ wherein u is defined above.

In other embodiments, a compound of Formula (II) is provided as a mixture fluoroalcohols. In some embodiments, a mixture can comprise any two or more of the following fluoroalcohols: $(C_4F_9)(CH_2)_uOH$, $(C_6F_{13})(CH_2)_uOH$, $(C_8F_{17})(CH_2)_uOH$, $(C_{10}F_{21})(CH_2)_uOH$, $(C_{12}F_{25})(CH_2)_uOH$, $(C_{14}F_{28})(CH_2)_uOH$, $(C_{16}F_{33})(CH_2)_uOH$, $(C_{18}F_{39})(CH_2)_uOH$ and $(C_{20}F_{41})(CH_2)_uOH$, wherein u is defined above.

In some embodiments, the organic component further comprises molecules of at least one non-fluorinated compound having at least one isocyanate reactive functionality. In some embodiments, a non-fluorinated compound having at least one isocyanate reactive functionality is a compound of Formula (III):

$$R^o\text{—}X\text{—}H \qquad (III)$$

wherein $R^o$ and X are defined above. In some embodiments, a compound of Formula (III) comprises one or more monoalkyl ethers of a polyalkylene glycol having the formula

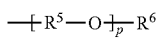

as defined above. In some embodiments, for example, molecules of a compound of Formula (III) react with unreacted isocyanate groups of the reaction product resulting from the combination of the polyisocyanate component with the diol component and/or diamine component.

In some embodiments, a compound of Formula (III) comprises a chlorinated alcohol. Non-limiting examples of chlorinated alcohols comprise 1,3-dichloro-2-propanol, 2,2,2-trichloroethanol and 2,2-dichloroethanol.

Moreover, a compound of Formula (III), in some embodiments, comprises epoxy or glycidyl alcohols. A non-limiting example of an epoxy alcohol is 2,3-epoxy-1-propanol. In some embodiments, a compound of Formula (III) comprises hydroxy functional acrylates and methacrylates including, but not limited to, 2-hydroxyethylmethacrylate, 2-hydroxyethylacrylate, 2-hydroxypropylmethacrylate and 2-hydroxypropylacrylate.

In some embodiments, a fluorinated compound comprising a reaction product of a polyisocyanate component and a diol component or a diamine component or a mixture thereof, the reaction product further reacted with an organic component is a compound of Formula (I):

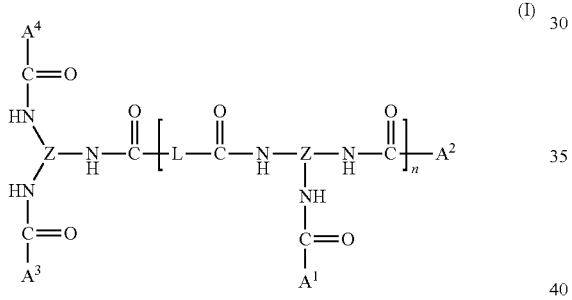

wherein Z is a trivalent organic group;
L is a divalent diol, diamine, urea, dialcohol amine or an aminoalcohol or a mixture thereof;
n ranges from 1 to 30;
and $A^1$, $A^2$, $A^3$ and $A^4$ are independently selected from the group consisting of $R^f$—$R^a$—X— and $R^o$—X—, wherein at least one of $A^1$, $A^2$, $A^3$ and $A^4$ is $R^f$—$R^a$—X—;
wherein $R^f$ is a fluoroalkyl;
$R^a$ is a direct bond, alkyl, —$C_mH_{2m}$SO—, —$C_mH_{2m}$SO$_2$—, —SO$_2$N($R^1$)—, —CON($R^1$)—, wherein m ranges from 1 to 20 and $R^1$ is hydrogen or alkyl; and
X is —O—, —S— or —N($R^2$)—, wherein $R^2$ is hydrogen or alkyl; and
$R^o$ is -alkyl, -alkenyl, -cycloalkyl, -chloroalkyl, -chloroalkenyl, -chlorocycloalkyl, —O-alkyl-glycidyl, —$R^3$—O—$R^4$,

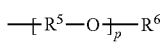

or —O—$R^{24}$—O—C(O)—$R^{25}$,
wherein $R^3$, $R^4$, $R^5$, $R^6$, $R^{24}$ and $R^{25}$ are independently selected from the group consisting of alkyl and alkenyl and p ranges from 1 to 50 and wherein the alkyl and alkenyl of $R^3$-$R^6$, $R^{24}$ and $R^{25}$ are optionally independently substituted one or more times with a substituent selected from the group consisting of alkyl, alkenyl, and halo.

In some embodiments, $A^1$ is independently selected for each repeating unit in Formula (I). In some embodiments of a compound of Formula (I), for example, $A^1$ is $R^f$—$R^a$—X— in one repeating unit and $R^o$—X— in another repeating unit. Moreover, in some embodiments, $A^1$ is the same in all or substantially all of the repeating units of a compound of Formula (I).

In some embodiments, Z is selected from the following trivalent organic compounds:

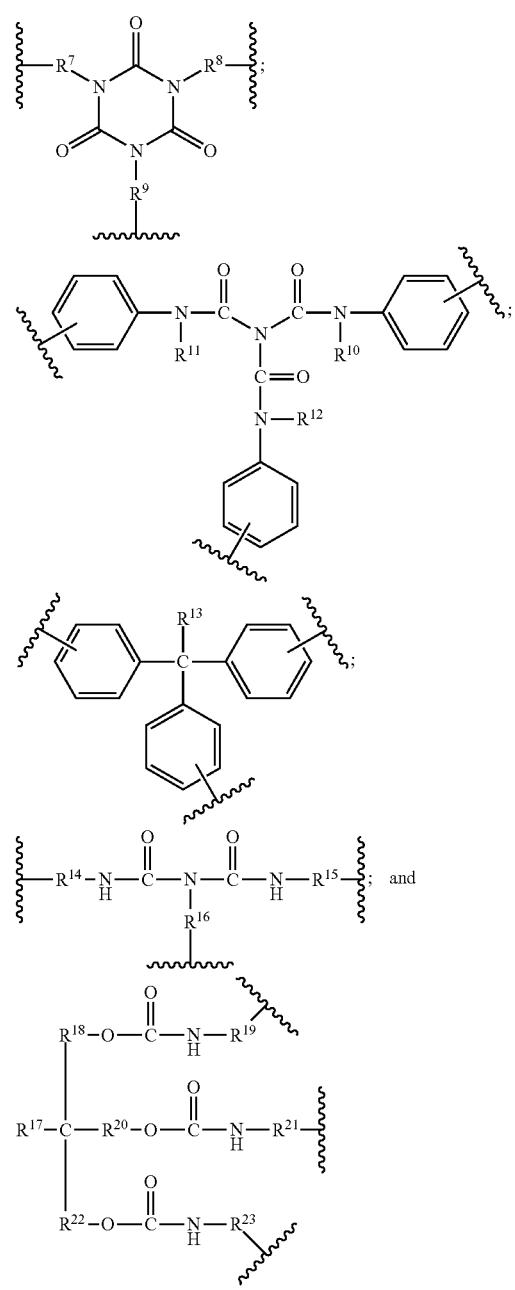

wherein $R^7$, $R^8$, $R^9$, $R^{13}$, $R^{14}$, $R^{15}$, $R^{16}$, $R^{17}$, $R^{18}$, $R^{19}$, $R^{20}$, $R^{21}$, $R^{22}$ and $R^{23}$ are independently selected from the group consisting of alkyl, alkenyl, cycloalkyl, and aryl; and wherein $R^{10}$, $R^{11}$ and $R^{12}$ are independently selected from the group consisting of hydrogen and alkyl;

wherein the alkyl, alkenyl, cycloalkyl and aryl of groups of $R^7$-$R^{23}$ are optionally independently substituted one or more times with a substituent selected from the group consisting of -alkyl, -alkenyl, -fluoroalkyl, -chloroalkyl, bromoalkyl, -aryl, —O-alkyl, —O-alkenyl, —O-aryl, —O-alkylene-aryl, -carboxyl, -hydroxyl, -halo and -nitro; and wherein ⁝ is a point of attachment of the trivalent organic compound in Formula (I).

Additionally, in some embodiments $R^o$ is a monoalkyl ether of a polyalkylene glycol having the formula

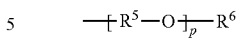

as defined above. In some embodiments, $R^o$ comprises a monoalkylether of a polyethylene glycol, polypropylene glycol or copolymers thereof.

Non-limiting examples of a compounds of Formula (I) are as follows:

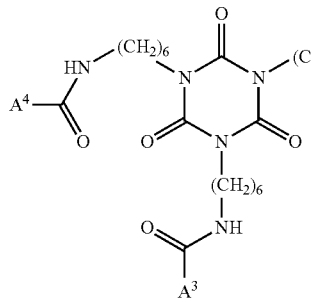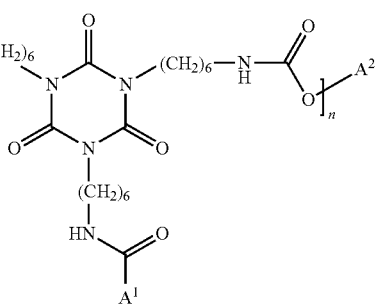

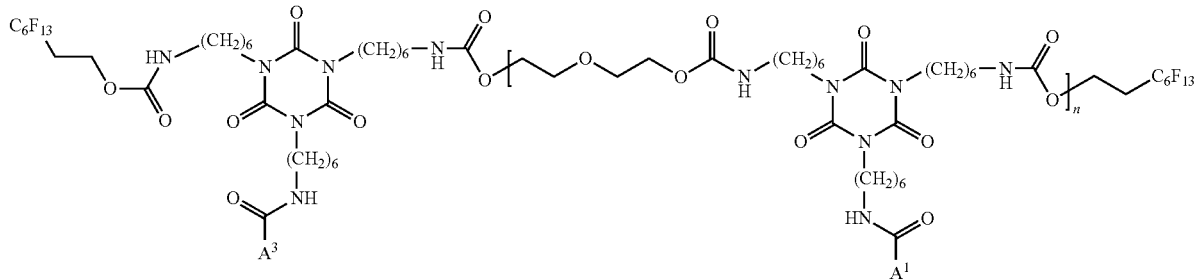

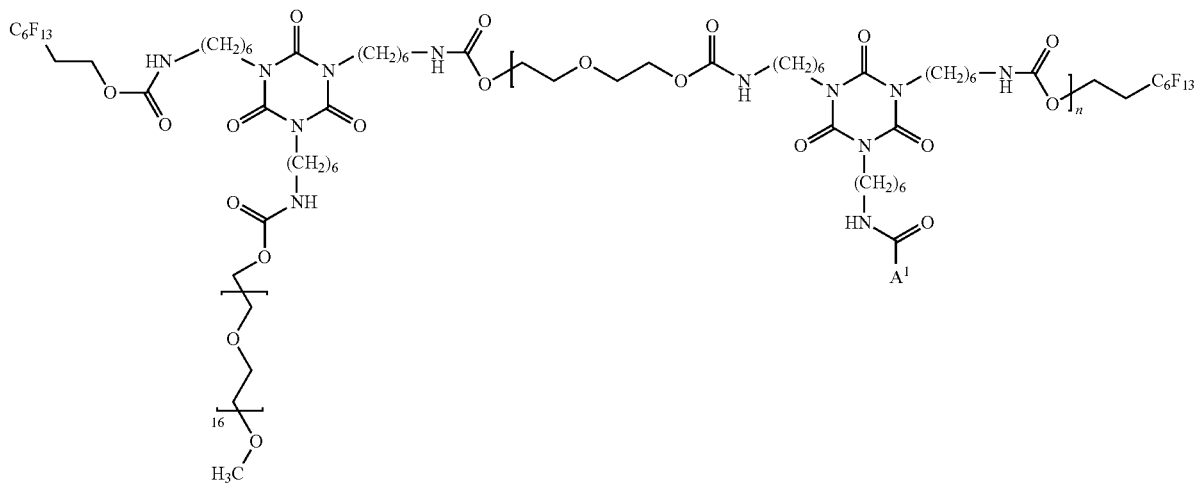

wherein $A^1$, $A^2$, $A^3$ and $A^4$ are independently selected from the group consisting of $(C_6F_{13})(CH_2)_6O-$ and

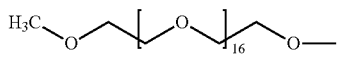

and n is defined above. As described herein, it is important to note that identity of $A^1$ can be independently selected for each repeating group in the foregoing non-limiting examples. In one embodiment, example, $A^1$ of one repeating unit is a flourocompound of formula $(C_6F_{13})(CH_2)_6O-$ while $A^1$ of another repeating unit is a methyl ether of polyethylene glycol of the foimula:

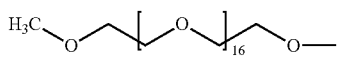

In some embodiments, at least one of $A^1$ through $A^4$ comprises a chloroalkyl group. As discussed further herein, in some embodiments, chloroalkyl groups can be provided as chloroalcohols in the synthesis of compounds of Formula (I). In some embodiments, chloroalkyl groups can enhance the resistance to flammability of dispersions and/or substrates comprising compounds of Formula (I).

In some embodiments, a fluorinated compound, including a compound of Formula (I), comprising a reaction product of a polyisocyanate component and a diol component or a diamine component or a mixture thereof, the reaction product further reacted with an organic component has a molecular weight of at least about 2,000. In some embodiments, a fluorinated compound has a molecular weight of at least about 4,000. In some embodiments, a fluorinated compound has a molecular weight greater than about 8,000. In one embodiment, for example, a fluorinated compound has a molecular weight ranging from about 8,250 to about 20,000. In another embodiment, a fluorinated compound has a molecular weight ranging from about 9,000 to about 15,000. In some embodiments, a fluorinated compound has a molecular weight less than about 2,000 or greater than about 20,000.

In some embodiments, the molecular weight of a fluorinated compound, such as a compound of Formula (I), can be controlled based on the amount of chain extender (e.g., diol, diamine, urea, dialcohol amine or aminoalcohol) used in producing the compound. Lower amounts of chain extender, for example, can produce fluorinated compounds having lower molecular weights while higher amounts of chain extender can produce fluorinated compounds having higher molecular weights. Moreover, in some embodiments, the molecular weight of fluorinated compounds described herein can be controlled based on the identity of a polyglycol used in the synthesis of the compounds. Higher molecular weight polyglycols, in some embodiments, can provide fluorinated compounds with higher molecular weight.

In another aspect, the present invention provides an aqueous dispersion of a fluorinated compound comprising the reaction product of a polyisocyanate component and a diol component or a diamine component or a mixture thereof, the reaction product further reacted with an organic component as described herein. In some embodiments, aqueous dispersions of fluorinated compounds described herein are free or substantially free of dispersing aids including, but not limited to, surfactants, emulsifiers and/or organic cosolvents.

In some embodiments, an aqueous dispersion comprises particles of a fluorinated compound described herein having an average size ranging from about 1 nm to about 500 nm. In other embodiments, an aqueous dispersion comprises particles of a fluorinated compound having an average size ranging from about 10 nm to about 400 nm or from about 50 nm to about 300 nm. In another embodiment, an aqueous dispersion comprises particles of a fluorinated compound described having an average size ranging from about 100 nm to about 250 nm. In some embodiments, an aqueous dispersion comprises particles of a fluorinated compound having an average size ranging from about 10 nm to about 120 nm or from about 20 nm to about 100 nm. In a further embodiment, an aqueous dispersion comprises particles of a fluorinated compound having an average size less than about 1 nm or greater than about 500 nm.

An aqueous dispersion can comprise any desired amount of a fluorinated compound. In some embodiments, an aqueous dispersion comprises particles of a fluorinated compound described herein in an amount ranging from about 0.01 weight percent to about 30 weight percent. In some embodiments an aqueous dispersion comprises particles of a fluorinated compound in an amount ranging from about 1 weight percent to about 25 weight percent. In another embodiment, an aqueous dispersion comprises particles of a fluorinated compound in an amount ranging from about 5 weight percent to about 20 weight percent. In some embodiments, an aqueous dispersion comprises particles of a fluorinated compound in an amount ranging from about 10 weight percent to about 15 weight percent. In a further embodiment, an aqueous dispersion of the present invention comprises particles of a fluorinated compound in an amount less than about 0.01 weight percent or in an amount greater than about 30 weight percent.

In some embodiments, an aqueous dispersion can further comprise other fluorochemical species dispersed in the aqueous phase in addition to a fluorinated compound described herein. Additional fluorochemical species, in some embodiments, comprise fluoroalkyl methacrylates, fluoroalkyl acrylates, fluoroalkyl aryl urethanes, fluoroalkyl urethanes, aliphatic fluoroalkyl urethanes, fluoroalkyl allyl urethanes, fluoroalkyl urethane acrylates, fluoroalkyl acrylamides, or fluoroalkyl sulfonamide acrylates or mixtures thereof. In some embodiments, additional fluorochemical species comprise polytetrafluoroethylene (PTFE), fluorinated ethylene-propylene (FEP), perfluoroalkoxy resin (PFA), polychlorotrifluoroethylene (PCTFE), ethylene-tetrafluoroethylene (EPTFE), polyvinylidene fluoride (PVDF), or polyvinyl fluoride (PVF) or mixtures thereof. Additional fluorochemical species, in some embodiments, can have particle sizes consistent with the particles sizes recited for fluorinated compounds described herein.

The present invention, in another aspect, provides a substrate at least partially treated or coated with a fluorinated compound described herein, including, but not limited to, a compound of Formula (I). In some embodiments, a fluorinated compound is applied to substrate as an aqueous dispersion. In some embodiments, wherein an aqueous dispersion of a fluorinated compound does not comprise dispersing aids, a substrate treated with such a dispersion is not subjected to subsequent washing or extraction steps to remove residual dispersing aids.

Substrates, in some embodiments, comprise cellulosic materials, including paper, wood, cellulose acetate fibers, and cotton materials, including, but not limited to, cotton fibers, woven cotton articles, and non-woven cotton articles.

In other embodiments, a substrate comprises other natural fibers including, but not limited to, wool and silk fibers.

In some embodiments, a substrate comprises synthetic fibers. Synthetic fibers, in some embodiments, comprise nylon (polyamide) fibers, polyester fibers such as PTT, polyethylene terephthalate (PET), polybutylene terephthalate (PBT), polyolefin fibers such as polypropylene, polyurethane fibers, polyacrylonitrile fibers, or combinations or composites thereof. In some embodiments, for example, a substrate comprises a mixture or combination of synthetic fibers including PTT fibers combined with any one of polyester fibers such as PET and/or PBT fibers, polyamide fibers, polyolefin fibers such as polypropylene fibers, polyurethane fibers, and/or any combination thereof. In some embodiments, for example, a substrate comprises a combination of synthetic fibers, including PTT fibers, with natural fibers. Substrates comprising various combinations of fibers, in some embodiments of the present invention, are considered composite substrates.

In a further embodiment, a substrate comprises leather, thermoplastics, thermosets, metals, porcelain, carpet, masonry, stones, brick, wood, plastics, painted surfaces, and dyed surfaces.

In coating or treating a substrate with an aqueous dispersion, a fluorinated compound described herein, in some embodiments, is associated with one or more surfaces of the substrate. In some embodiments, a fluorinated compound is associated with a surface of the substrate through electrostatic interactions, covalent bonds, dipole-dipole interactions, van der Waals interactions or hydrophobic interactions or combinations thereof. In other embodiments, a fluorinated compound is associated with a surface of a substrate by mechanical engagement. In one embodiment, for example, a fluorinated compound is trapped between a plurality of filaments in a fiber such as a synthetic fiber.

In some embodiments, a substrate treated or coated with a fluorinated compound described herein can demonstrate increased repellency of oil and water. Moreover, in some embodiments, a substrate treated or coated with a fluorinated compound can demonstrate advantageous soil resistance and/or release properties.

In some embodiments, a substrate treated with an aqueous dispersion of a fluorinated compound described herein has an oil repellency of at least 5 according to the American Association of Textile Chemists and Colorists (AATCC) Test Method 118. In other embodiments, a substrate treated with an aqueous dispersion of a fluorinated compound has an oil repellency of at least 6 according to AATCC 118.

In some embodiments, aqueous dispersion of the present invention can be applied to a substrate by spray coating, dip coating, foaming, exhausting, passing the substrate through kiss rollers or spreading onto or coating the substrate through a head box, optionally with the aid of a doctor blade or any other application or exhaustion method or technique known to one of skill in the art.

Moreover, in some embodiments, a substrate treated with an aqueous dispersion of a fluorinated compound described herein can be further treated with an additional fluorochemical species including, but not limited to, fluoroalkyl methacrylates, fluoroalkyl acrylates, fluoroalkyl aryl urethanes, fluoroalkyl urethanes, aliphatic fluoroalkyl urethanes, fluoroalkyl allyl urethanes, fluoroalkyl urethane acrylates, fluoroalkyl acrylamides, or fluoroalkyl sulfonamide acrylates or mixtures thereof. In other embodiments, polymeric particles comprise polytetrafluoroethylene (PTFE), fluorinated ethylene-propylene (FEP), perfluoroalkoxy resin (PFA), polychlorotrifluoroethylene (PCTFE), ethylene-tetrafluoroethylene (EPTFE), polyvinylidene fluoride (PVDF), or polyvinyl fluoride (PVF) or mixtures thereof.

In some embodiments, the additional fluorochemical species is a component of the aqueous dispersion of a fluorinated compound described herein. In other embodiments, the additional fluorochemical is not a component of an aqueous dispersion of a fluorinated compound described herein and is applied as a separate and independent composition to a substrate.

In another aspect, the present invention provides methods of producing fluorinated compounds. In one embodiment, a method of producing a fluorinated compound comprises reacting a polyisocyanate component with a diol component or a diamine component or a mixture thereof to provide a reaction product and reacting the reaction product with an organic component comprising molecules of at least one compound having a plurality of fluorinated carbon atoms and at least one isocyanate reactive functionality. In some embodiments, the organic component further comprises molecules of at least one non-fluorinated compound having at least one isocyanate reactive functionality.

In some embodiments, a method of producing a fluorinated compound of Formula (I) comprises reacting an amount of a trifunctional isocyanate compound of formula:

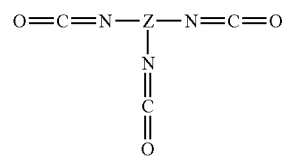

with an amount of a diol, diamine, urea, dialcohol amine, or an aminoalcohol or a mixture thereof of formula:

H-L-H to produce a reaction product of Formula (IA):

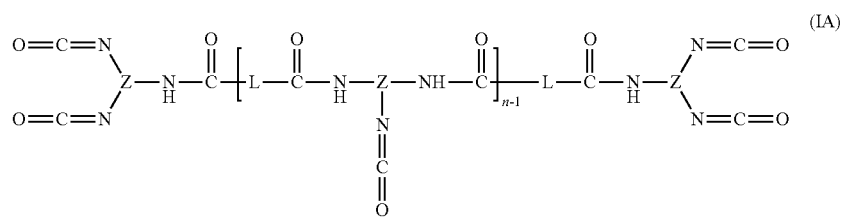

wherein Z and L are defined above.

In some embodiments, a diol of formula H-L-H is selected from the group consisting of ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cylcohexanediol or mixtures thereof. In some embodiments, a diol of formula H-L-H comprises one or more diols having a polymeric structure including, but not limited to, polyalkylene glycols such as polyethylene glycols, polypropylene glycols or mixtures thereof. In some embodiments, diols having a polymeric structure comprise polyester-based diols, polycarbonate-based diols or mixtures thereof. A diol having a polymeric structure can have any desired molecular weight not inconsistent with the objectives of the present invention.

In some embodiments, a dialcohol amine of formula H-L-H is diethanolamine, methyldiethanolamine or phenyldiethanolamine or mixtures thereof. In some embodiments, an aminoalcohol of formula H-L-H is aminopropanol or ethanolamine or a mixture thereof.

In some embodiments, a diamine of formula H-L-H comprises ethylene diamine, propylene diamine, butylene diamine or hexamethylene diamine or mixtures thereof. A diamine also encompasses diamine derivatives including, but not limited to, diamides such as urea.

Moreover, in some embodiments, trifunctional isocyanate compounds can be obtained from Bayer Material Science of Pittsburgh, Pa. under the DESMODUR® trade designation.

In some embodiments, a reaction product of Formula (IA) can be oligomeric or polymeric. Trifunctional isocyanate and diol and/or diamine can be provided in any desired amount or ratio to produce a reaction product of Formula (IA). As provided herein, increased amounts of diol and/or diamine can increase the molecular weight of a reaction product of Formula (IA) which concomitantly increases the molecular weight of a fluorinated compound of Formula (I).

In some embodiments, trifunctional isocyanate and diol can be reacted in the presence of a catalyst, such as dibutyltin dilaurate, in a reaction vessel under nitrogen, with agitation and at a temperature ranging from about 65° C. to about 105° C. for a period of two hours to produce a reaction product of Formula (IA).

Unreacted isocyanate groups of a reaction product of Formula (IA) are independently reacted with a compound selected from the groups consisting of Formula (II) and Formula (III):

$$R^f\text{—}R^a\text{—}X\text{—}H \quad (II)$$

$$R^o\text{—}X\text{—}H \quad (III)$$

such that all or substantially all of the unreacted isocyanate groups of the reaction product of Formula (IA) have been reacted resulting in a compound of Formula (I), wherein $R^f$, $R^a$, $R^o$ and X are defined above. As provided herein, in some embodiments, an unreacted isocyanate group of each repeating unit of a reaction product of Formula (IA) can react with a compound of Formula (II) or a compound of Formula (III). As a result, in some embodiments, an unreacted isocyanate of one repeating unit can react with a compound of Formula (II) while an unreacted isocyanate group on an adjacent repeating unit can react with a compound of Formula (III). In other embodiments, unreacted isocyanate groups of adjacent repeating units each react with a compound of Formula (II) or each react with a compound of Formula (III).

Independently reacting unreacted isocyanate groups with a compound selected from the group consisting of Formula (II) and Formula (III), in some embodiments, can be achieved by adding compounds of Formula (II) and Formula (III) to a reaction vessel comprising a reaction product of Formula (IA). Once added, the reaction mixture can be held above 95° C. for a period of two hours resulting in the production of a fluorinated compound of Formula (I).

In some embodiments, a compound of Formula (II) comprises a fluorinated alcohol of the formula $(C_qF_{2q+1})(CH_2)_uOH$, wherein q ranges from 4 to 20 and u ranges from 1 to 20. In one embodiment, for example, a compound of Formula (II) provided for reaction with unreacted isocyanate groups of a reaction product of Formula (IA) is a single species of fluorinated alcohol. In some embodiments, a single species of fluorinated alcohol is selected from the group consisting of $(C_4F_9)(CH_2)_uOH$, $(C_6F_{13})(CH_2)_uOH$, $(C_8F_{17})(CH_2)_uOH$, $(C_{10}F_{21})(CH_2)_uOH$, $(C_{12}F_{25})(CH_2)_uOH$, $(C_{14}F_{28})(CH_2)_uOH$, $(C_{16}F_{33})(CH_2)_uOH$, $(C_{18}F_{39})(CH_2)_uOH$ and $(C_{20}F_{41})(CH_2)_uOH$, wherein u is defined above. In other embodiments, a compound of Formula (II) provided for reaction with unreacted isocyanate groups of a reaction product of Fommla (IA) comprises a mixture fluoroalcohols. In some embodiments, a mixture can comprise any two or more of the following fluoroalcohols: $(C_4F_9)(CH_2)_uOH$, $(C_6F_{13})(CH_2)_uOH$, $(C_8F_{17})(CH_2)_uOH$, $(C_{10}F_{21})(CH_2)_uOH$, $(C_{12}F_{25})(CH_2)_uOH$, $(C_{14}F_{28})(CH_2)_uOH$, $(C_{16}F_{33})(CH_2)_uOH$, $(C_{18}F_{39})(CH_2)_uOH$ and $(C_{20}F_{41})(CH_2)_uOH$, wherein u is defined above.

Moreover, in some embodiments, a compound of Formula (III) comprises a monoalkyl ether of a polyalkylene glycol having the formula $$-\!\!\!+\!\!R^5\!\!-\!\!O\!\!-\!\!\!\!\Big]_p\!\!-\!\!R^6$$

as defined above. In some embodiments, a compound of Formula (III) provided for reaction with unreacted isocyanate groups of a reaction product of Formula (IA) is a single species of a monoalkyl ether of a polyalkylene glycol. In other embodiments, a compound of Formula (III) provided for reaction with unreacted isocyanate groups of a reaction product of Formula (IA) comprises a mixture of various monoalkyl ethers of polyalkylene glycols.

Any monoalkyl ether of a polyalkylene glycol not inconsistent with the objectives of the present invention can be used for reaction with unreacted isocyanate groups of a reaction product of Formula (IA) in the production of a fluorinated compound of Formula (I). In some embodiments, monoalkyl ether polyalkylene glycols are selected based on the desired molecular weight of a fluorinated compound of Formula (I). In some embodiments, monoalkylether polyalkylene glycols comprise methoxypolyethylene glycols (MPEG) such as MPEG 350, MPEG 550, MPEG 750, MPEG 1000 or MPEG 1450 or mixtures thereof. In some embodiments, monoalkylether polyalkylene glycols comprise methoxypropylene glycols. In another embodiment, monoalkylether polyalkylene glycols comprise polyethylene and polypropylene glycol copolymers.

In some embodiments, a compound of Formula (III) comprises a chlorinated alcohol. Non-limiting examples of chlorinated alcohols comprise 1,3-dichloro-2-propanol, 2,2,2-trichloroethanol and 2,2-dichloroethanol.

Moreover, a compound of Formula (III), in some embodiments, comprises epoxy or glycidyl alcohols. A non-limiting example of an epoxy alcohol is 2,3-epoxy-1-propanol. In some embodiments, a compound of Formula (III) comprises hydroxy functional acrylates and methacrylates including, but not limited to, 2-hydroxyethylmethacrylate, 2-hydroxyethylacrylate, 2-hydroxypropylmethacrylate and 2-hydroxypropylacrylate.

In some embodiments, a compound of Formula (III) provided for reaction with unreacted isocyanate groups of a reaction product of Formula (IA) comprises a mixture comprising at least two of polyalkylene glycol, a chlorinated alcohol, a glycidyl alcohol and a hydroxy functional acrylate.

As provided herein, methods of producing fluorinated compounds, in some embodiments, do not employ organic solvents.

In another aspect, the present invention provides a method of producing an aqueous dispersion of a fluorinated compound comprising the reaction product of a polyisocyanate component and a diol component or a diamine component or a mixture thereof, the reaction product further reacted with an organic component comprising molecules of at least one compound having a plurality of fluorinated carbon atoms and at least one isocyanate reactive functionality. In one embodiment, a method of producing a dispersion of a fluorinated compound described herein comprises providing the fluorinated compound and dispersing the fluorinated compound in an aqueous medium without the use of a dispersing aid. Fluorinated compounds can be provided according to the methods of synthesis described herein.

Synthesis of fluorinated compounds described herein in the absence of organic solvents, in some embodiments, can facilitate the production of aqueous dispersions of the fluorinated compounds. The absence of an organic solvent, for example, can preclude the requirement to strip or further process the organic solvent during production of the aqueous dispersion. As a result, in some embodiments, water can be added directly to the reaction mixture comprising a fluorinated compound to produce an aqueous dispersion of the fluorinated compound. In some embodiments, water can be added directly to the reaction mixture comprising a fluorinated compound to produce an aqueous dispersion having any of the weight percents of particles of fluorinated compounds recited herein.

In a further aspect, the present provides methods of enhancing the oil and/or water repellency of substrates, including fibers, textiles, carpets and floor coverings. In one embodiment, a method of enhancing the oil and/or water repellency of a substrate comprises providing an aqueous dispersion of a fluorinated compound described herein and applying the aqueous dispersion to the substrate.

In some embodiments, applying the aqueous dispersion to the substrate comprises spray coating, dip coating, foaming, exhausting, passing the substrate through kiss rollers or spreading onto or coating the substrate through a head box, optionally with the aid of a doctor blade or any other application or exhaustion method or technique known to one of skill in the art.

Some exemplary embodiments of the present invention will now be illustrated in the following specific, non-limiting examples.

EXAMPLE 1

Synthesis of a Fluorinated Compound

A non-limiting embodiment of fluorinated compound of the present invention was produced according to the following method. 32.25 kg of DESMODUR® N-3300A (165.44 NCO molar equivalent by titration)(Bayer Materials Science of Leverkusen, Germany) and 0.220 kg (2.07 mole) of diethylene glycol were provided to a reaction vessel. The agitator of the reaction vessel was set to 30 rpm and 0.018 kg of dibutyltin laurate catalyst was added to the reaction vessel. The reaction vessel was closed and heated to a temperature of 95° C. for two hours with the head space in the reaction vessel being swept by nitrogen.

14.99 kg (19.99 mol) of MPEG 750 and 52.54 kg of 1H,1H,2H,2H-tridecafluoro-1-n-octanol (144.34 mol)(FLUOWET® EA-600 from Clariant GmbH) were added to the reaction mixture in the reaction vessel. The reaction vessel was heated to 95° C. for a period of two hours to produce the fluorinated compound. The reaction product was analyzed to verify the absence of unreacted isocyanate groups within the limits of detection of the analytical methods used. The fluorinated compound produced by the foregoing method had a molecular weight of about 4,600.

EXAMPLE 2

Production of an Aqueous Dispersion of a Fluorinated Compound

The reaction mixture comprising the fluorinated compound synthesized in Example 1 was diluted with a sufficient amount of water to produce an aqueous dispersion comprising particles of the fluorinated compound in an amount of about 30 weight percent. No dispersing aids were added to assist in producing the dispersion of the fluorinated compound of Example 1. Moreover, as the fluorinated compound of Example 1 was produced without organic solvents, stripping of organic solvent from the aqueous dispersion was precluded.

EXAMPLE 3

Synthesis of a Compound of Fluorinated Compound

A non-limiting embodiment of a fluorinated compound of the present invention was produced according to the following method. 9.74 kg of DESMODUR® N-3300A (46.7 NCO molar equivalent by titration)(Bayer Materials Science of Leverkusen, Germany) and 0.066 kg (0.58 mole) of diethylene glycol were provided to a reaction vessel. The agitator of the reaction vessel was set to 30 rpm and 0.005 kg of dibutyltin laurate catalyst was added to the reaction vessel. The reaction vessel was closed and heated to a temperature of 95° C. for two hours with the head space in the reaction vessel being swept by nitrogen.

1.6 kg (11.64 mol) of 1,3-dichloro-2-propanol, 4.53 kg (5.64 mol) of MPEG 750 and 11.45 kg of 1H,1H,2H,2H-tridecafluoro-1-n-octanol (29.4 mol)(FLUOWET® EA-600 from Clariant GmbH) were added to the reaction mixture in the reaction vessel. The reaction vessel was heated to 95° C. for a period of two hours to produce the fluorinated compound. The reaction product was analyzed to verify the absence of unreacted isocyanate groups within the limits of detection of the analytical methods used. The fluorinated compound produced by the foregoing method had a molecular weight of about 2,200.

EXAMPLE 4

Production of an Aqueous Dispersion of a Fluorinated Compound

The reaction mixture comprising the fluorinated compound synthesized in Example 3 was diluted with a sufficient amount of water to produce an aqueous dispersion comprising particles of the fluorinated compound in an amount of about 27.4 weight percent. No dispersing aids were added to assist in producing the dispersion of the compound of Formula (I). Moreover, as the fluorinated compound of Example 3 was produced without organic solvents, stripping of organic solvent from the aqueous dispersion was precluded.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

EXAMPLE 5

Synthesis of a Fluorinated Compound

A non-limiting embodiment of fluorinated compound of the present invention was produced according to the following method. 94.73 g of DESMODUR® N-3300A (0.492 NCO molar equivalent by titration)(Bayer Materials Science of Leverkusen, Germany) and 0.05 g of dibutyltin dilaurate catalyst were provided to a reaction glass vessel. The agitator of the reaction vessel was set to 30 rpm, the batch was heated to 50° C. and 3.6 g (0.006 mole) of polyethylene glycol (PEG) 600 was added to the reaction vessel. The reaction vessel was closed and heated to a temperature of 65° C. for two hours with the head space in the reaction vessel being swept by nitrogen.

44.1 g (0.0588 mol) of MPEG 750 and 154.34 g of 1H,1H,2H,2H-tridecafluoro-1-n-octanol (0.424 mol)(FLU-OWET® EA-600 from Clariant GmbH) were added in three portions over two hours to the reaction mixture in the reaction vessel. The reaction vessel was heated to 85° C. for a period of one hour after the last addition to produce the fluorinated compound. The reaction product was analyzed to verify the absence of unreacted isocyanate groups within the limits of detection of the analytical methods used. The fluorinated compound produced by the foregoing method had a molecular weight of about 3,900.

EXAMPLE 6

Synthesis of a Fluorinated Compound

A non-limiting embodiment of fluorinated compound in of the present invention was produced according to the following method. 94.73 g of DESMODUR® N-3300A (0.492 NCO molar equivalent by titration)(Bayer Materials Science of Leverkusen, Germany) and 0.05 g of dibutyltin dilaurate catalyst were provided to a reaction glass vessel. The agitator of the reaction vessel was set to 30 rpm, the batch was heated to 50° C. and 7.2 g (0.012 mole) of polyethylene glycol (PEG) 600 was added to the reaction vessel. The reaction vessel was closed and heated to a temperature of 65° C. for two hours with the head space in the reaction vessel being swept by nitrogen.

39.63 g (0.0528 mol) of MPEG 750 and 152.154 g of 1H,1H,2H,2H-tridecafluoro-1-n-octanol (0.418 mol)(FLU-OWET® EA-600 from Clariant GmbH) were added in three portions over two hours to the reaction mixture in the reaction vessel. The reaction vessel was heated to 85° C. for a period of one hour after the last addition to produce the fluorinated compound. The reaction product was analyzed to verify the absence of unreacted isocyanate groups within the limits of detection of the analytical methods used. The fluorinated compound produced by the foregoing method had a molecular weight of about 4,500.

Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention.

That which is claimed is:

1. An aqueous dispersion comprising:
    particles comprising a fluorinated compound, wherein the fluorinated compound comprises
    a reaction product of
    (i) a polyisocyanate component and
    (ii) a diol component comprising ethylene glycol; diethylene glycol; triethylene glycol; tetraethylene glycol; propylene glycol; dipropylene glycol; tripropylene glycol; 1,3-propanediol; 1,3-butanediol; 1,4-butanediol; neopentyl glycol; 1,6-hexanediol; 1,4-cyclohexanediol; or a mixture thereof,
    the reaction product further reacted with an organic component comprising
    (a) fluorinated molecules having a plurality of fluorinated carbon atoms and at least one isocyanate reactive functionality, and
    (b) non-fluorinated molecules of Formula (III):

$$R^o\text{—}X\text{—}H \qquad (III)$$

wherein X is —O—, —S— or —N(R²)—, and R² is hydrogen;
wherein R° is methyl, ethyl, or propyl, —R³—O—R⁴,

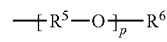

or —O—R²⁴—O—C(O)—R²⁵, and R³, R⁴, R⁵, R⁶, R²⁴ and R²⁵ are independently selected from the group consisting of methyl, ethyl, and propyl, and p ranges from 1 to 50
wherein the fluorinated compound has a molecular weight ranging from about 8,250 to about 20,000.

2. The aqueous dispersion of claim 1, wherein the particles of the fluorinated compound have an average size ranging from about 10 nm to about 400 nm.

3. The aqueous dispersion of claim 1, wherein the polyisocyanate component comprises trifunctional isocyanate molecules.

4. The aqueous dispersion of claim 1, wherein the polyisocyanate component comprises one or more of

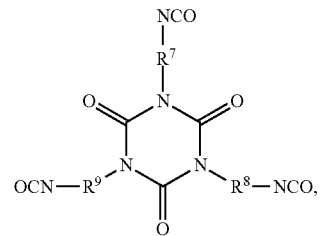

-continued

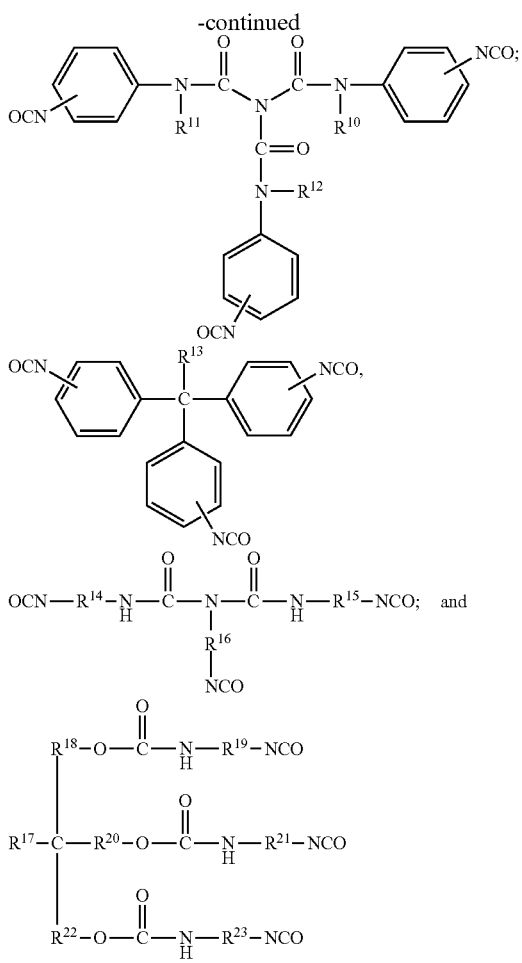

wherein $R^7$, $R^8$, $R^9$, $R^{13}$, $R^{14}$, $R^{15}$, $R^{16}$, $R^{17}$, $R^{18}$, $R^{19}$, $R^{20}$, $R^{21}$, $R^{22}$ and $R^{23}$ are independently selected from the group consisting of alkyl, alkenyl, cycloalkyl, and aryl; and wherein $R^{10}$, $R^{11}$ and $R^{12}$ are independently selected from the group consisting of hydrogen and alkyl; and wherein the alkyl, alkenyl, cycloalkyl and aryl of groups of $R^7$-$R^{23}$ are optionally independently substituted one or more times with a substituent selected from the group consisting of -alkyl, -alkenyl, -fluoroalkyl, -chloroalkyl, bromoalkyl, -aryl, —O-alkyl, —O-alkenyl, —O-aryl, —O-alkylene-aryl, -carboxyl, -hydroxyl, -halo and -nitro.

5. The aqueous dispersion of claim 1, wherein the fluorinated molecules having a plurality of fluorinated carbon atoms and at least one isocyanate reactive functionality comprise a compound of Formula (II):

$$R^f\text{—}R^a\text{—}X\text{—}H \quad (II)$$

wherein R is a fluoroalkyl; $R^a$ is a direct bond, alkyl, —$C_mH_{2m}SO_2$—, —$SO_2N(R^1)$—, or —$CON(R^1)$—, wherein m ranges from 1 to 20 and $R^1$ is hydrogen or alkyl; and X is —O—, —S—, or —N($R^2$)—, wherein $R^2$ is hydrogen or alkyl.

6. The aqueous dispersion of claim 5, wherein the compound of Formula (II) comprises a fluorinated alcohol of the formula $(C_qF_{2q+1})(CH_2)_uOH$, wherein q ranges from 4 to 20 and u ranges from 1 to 20.

7. The aqueous dispersion of claim 1, wherein $R^o$ is

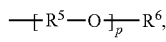

and $R^5$ and $R^6$ independently are methyl, ethyl, or propyl.

8. The aqueous dispersion of claim 7, wherein $R^5$ is ethyl and $R^6$ is methyl.

9. The aqueous dispersion of claim 7, wherein p ranges from about 7 to about 33.

10. The aqueous dispersion of claim 1, wherein the organic component further comprises 1,3-dichloro-2-propanol or 2,2-dichloroethanol.

11. An aqueous dispersion comprising:
particles comprising a compound of Formula (I):

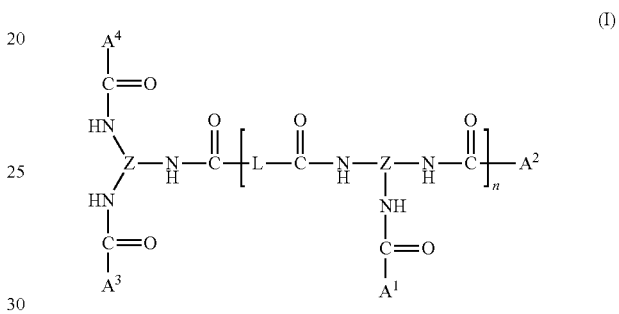

wherein Z is a trivalent organic group;
L is a divalent diol, diamine, urea, dialcohol amine, aminoalcohol or a mixture thereof;
n ranges from 1 to 30; and
$A^1$, $A^2$, $A^3$ and $A^4$ are independently selected from
$R^f$—$R^a$—X—; and
$R^o$—X—,
wherein $R^f$ is a fluoroalkyl; $R^a$ is a direct bond, alkyl, —$C_mH_{2m}SO$—, —$C_mH_{2m}SO_2$—, —$SO_2N(R^1)$—, or —$CON(R^1)$—, wherein m ranges from 1 to 20 and $R^1$ is hydrogen or alkyl; X is —O—, —S— or —N($R^2$)—, wherein $R^2$ is hydrogen or alkyl; and $R^o$ is -alkyl, -alkenyl, -cycloalkyl, -chloroalkyl, -chloroalkenyl, -chlorocycloalkyl, —O-alkyl-glycidyl, —$R^3$—O—$R^4$,

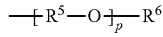

or —O—$R^{24}$—O—C(O)—$R^{25}$, wherein $R^3$, $R^4$, $R^5$, $R^6$, $R^{24}$ and $R^{25}$ are independently selected from the group consisting of alkyl and alkenyl and p ranges from 1 to 50 and wherein the alkyl and alkenyl of $R^3$-$R^6$, $R^{24}$ and $R^{25}$ are optionally independently substituted one or more times with a substituent selected from the group consisting of alkyl, alkenyl, and halo, and
wherein at least one of $A^1$, $A^2$, $A^3$ and $A^4$ is $R^f$—$R^a$—X— and at least one of $A^1$, $A^2$, $A^3$ and $A^4$ is $R^o$—X—.

12. The aqueous dispersion of claim 11, wherein
L is a divalent diol comprising ethylene glycol; diethylene glycol; triethylene glycol; tetraethylene glycol; propylene glycol; dipropylene glycol; tripropylene glycol;

1,3-propanediol; 1,3-butanediol; 1,4-butanediol; neopentyl glycol; 1,6-hexanediol; 1,4-cyclohexanediol; or a mixture thereof;

$A^1$, $A^2$, $A^3$ and $A^4$ are independently selected from
$R^f$—$R^a$—X—; and
$R^o$—X—,
wherein $R^f$ is a fluoroalkyl; $R^a$ is a direct bond, alkyl, —$C_mH_{2m}$SO—, —$C_mH_{2m}$SO$_2$—, —SO$_2$N($R^1$)—, or —CON($R^1$)—, wherein m ranges from 1 to 20 and $R^1$ is hydrogen or alkyl; X is —O—, —S— or —N($R^2$)—, wherein $R^2$ is hydrogen or alkyl; and $R^o$ is methyl, ethyl, or propyl, —$R^3$—O—$R^4$,

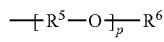

or —O—$R^{24}$—O—C(O)—$R^{25}$, and $R^3$, $R^4$, $R^5$, $R^6$, $R^{24}$ and $R^{25}$ are independently selected from the group consisting of methyl, ethyl, and propyl, and p ranges from 1 to 50.

13. The aqueous dispersion of claim 12, wherein the particles of the compound of Formula (I) have an average size ranging from about 10 nm to about 400 nm.

14. The aqueous dispersion of claim 12, wherein $R^f$ comprises $C_qF_{2q+1}$, wherein q ranges from 4 to 20; $R^a$ comprises $(CH_2)_u$, wherein u ranges from 1 to 20; and X is O.

15. The aqueous dispersion of claim 12, wherein for each $R^f$ present, q is independently 4, 6, 8, 10, 12, 14, 16, 18, or 20 or mixtures thereof.

16. The aqueous dispersion of claim 12, wherein $R^o$ is

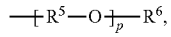

and $R^5$ and $R^6$ independently are methyl, ethyl, or propyl.

17. The aqueous dispersion of claim 16, wherein $R^5$ is ethyl and $R^6$ is methyl.

18. The aqueous dispersion of claim 16, wherein p ranges from about 7 to about 33.

19. The aqueous dispersion of claim 12, wherein the organic component further comprises 1,3-dichloro-2-propanol or 2,2-dichloroethanol.

20. An aqueous dispersion comprising:
a reaction product of
(i) a polyisocyanate component, and
(ii) a diamine component,
the reaction product further reacted with an organic component comprising
(a) fluorinated molecules having a plurality of fluorinated carbon atoms and at least one isocyanate reactive functionality, and
(b) non-fluorinated molecules of Formula (III):

$R^o$—X—H  (III)

wherein X is —O—, —S— or —N($R^2$)—, and $R^2$ is hydrogen;

wherein $R^o$ is methyl, ethyl, or propyl, —$R^3$—O—$R^4$,

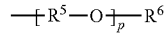

or —O—$R^{24}$—O—C(O)—$R^{25}$, or and $R^3$, $R^4$, $R^5$, $R^6$, $R^{24}$ and $R^{25}$ are independently selected from the group consisting of methyl, ethyl, and propyl, and p ranges from 1 to 50; and wherein the fluorinated compound has a molecular weight ranging from about 8,250 to about 20,000.

* * * * *